2,854,481

3-(PENTYLTHIO)-PROPIONALDEHYDE THIOSEMICARBAZONE

Richard W. Meikle, Newport Beach, Calif., assignor to The Dow Chemical Company, Midland, Mich., a corporation of Delaware No Drawing. Application July 29, 1957
Serial No. 674,577

2 Claims. (Cl. 260—552)

The present invention relates to 3-(pentylthio)-propionaldehyde thiosemicarbazone. The new compound is characterized by the formula

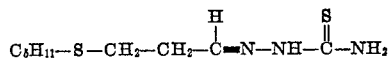

$$C_5H_{11}-S-CH_2-CH_2-\overset{H}{\underset{|}{C}}=N-NH-\overset{S}{\underset{\|}{C}}-NH_2$$

This compound is a crystalline solid somewhat soluble in many common organic solvents and of low solubility in water. The new compound is useful as a parasiticide and is adapted to be employed as an active toxic ingredient in dust and liquid compositions for the control of many insect and bacterial pests.

The new compounds may be prepared by causing a reaction to take place between thiosemicarbazide and 3-(pentylthio)-propionaldehyde. The reaction is carried out in an acid reaction medium such as an aqueous or inert organic solvent solution of a mineral acid. The reaction is somewhat exothermic and takes place smoothly at temperatures of from 20° C. to 100° C. Good results are obtained when employing substantially equimolecular proportions of the reactants or when employing a small excess of the thiosemicarbazide, and during the course of the reaction neutralizing some of the mineral acid in the reaction mixture with a buffering agent.

In carrying out the reaction, the 3-(pentylthio)-propionaldehyde is mixed or otherwise blended with the thiosemicarbazide dissolved in a solution of a mineral acid, such as aqueous hydrochloric acid. The contacting is carried out with stirring and at a temperature of from 20° C. to 100° C. The temperature conveniently may be controlled by external cooling and/or regulating the rate of contacting the reactants. Following the addition, a buffering agent, such as an alkali metal salt of a weak acid, may be added to the reaction mixture to reduce the acidity and promote the formation of the desired product. During the reaction, the desired product oftentimes precipitates in the reaction mixture as a crystalline solid. Upon completion of the reaction, the reaction mixture may be cooled to precipitate the desired product or to precipitate further product, and the product thereafter separated by filtration or decantation. The product may be purified by recrystallization from a suitable solvent such as ethanol.

The following example is illustrative of the present invention but is not to be construed as limiting the same.

In a representative operation, 160 grams (1 mole) of 3-(pentylthio)propionaldehyde was added to 100 grams (1.1 moles) of thiosemicarbazide dissolved in 180 milliliters (1.1 moles) of 6 normal hydrochloride acid. The addition was carried out with stirring and cooling of the reaction vessel in an ice bath. Following the addition, a solution of 180 grams (2.2 moles) of sodium acetate in 540 milliliters of water was added to the reaction mixture and the resulting mixture maintained for several hours with stirring and cooling and at a temperature of 30° C. During the latter period, a 3-(pentylthio)propionaldehyde thiosemicarbazone precipitated in the reaction mixture as a crystalline solid. The product was separated by filtration, recrystallized from aqueous ethanol, and found to melt at 172°–174° C.

The new compound is useful as a parasiticide for the control of many parasites such as Rhizoctonia solani. For such use the compound may be dispersed on a finely divided solid and employed as a dust. Also, such mixtures may be dispersed in water with the aid of a wetting agent, and the resulting suspensions employed as sprays. In other procedures, the product may be employed as a constituent of oil-in-water emulsions, or water dispersions with or without the addition of wetting, dispersing or emulsifying agents. In representative operations, substantially complete controls of Rhizoctonia solani were obtained when 3-(pentylthio)propionaldehyde thiosemicarbazone was distributed in the soil at a dosage of 100 parts by weight of toxicant per million parts of soil.

The 3-(pentylthio)propionaldehyde employed as a starting material in accordance with the present invention may be prepared from amyl mercaptan and acrolein by conventional methods. In one such method acrolein is slowly added to amyl mercaptan dissolved in dimethyl phthalate as reaction solvent and in the presence of a catalytic amount of diacetyl peroxide over a one and a quarter hour period with stirring and cooling and at a temperature of from about 30° to 35° C. Upon completion of the addition, additional peroxide was added with stirring. The resulting reaction mixture was distilled under reduced pressure to obtain a colorless 3-(pentylthio)-propionaldehyde product boiling at 86° to 89° C. at 0.50 to 0.85 millimeter of mercury.

I claim:

1. 3-(pentylthio)propionaldehyde thiosemicarbazone.
2. In the method for preparing 3-(pentylthio)propionaldehyde thiosemicarbazone the steps which comprise reacting 3-(pentylthio)propionaldehyde with thiosemicarbazide in the presence of a mineral acid medium and an alkali metal salt of a weak acid to control the acidity and recovering a 3-(penthylthio)-propionaldehyde thiosemicarbazone product as a crystalline solid.

No references cited.